US012586105B2

(12) United States Patent
Vukovic et al.

(10) Patent No.: US 12,586,105 B2
(45) Date of Patent: Mar. 24, 2026

(54) PRIVACY-PRESERVING ROAD USAGE CHARGING REPORTS

(71) Applicant: FORD GLOBAL TECHNOLOGIES, LLC, Dearborn, MI (US)

(72) Inventors: Ivan Vukovic, Birmingham, MI (US); Krishna Bandi, Farmington Hills, MI (US); Sathyanarayana Chary Palakonda, Northville, MI (US); Syed Amaar Ahmad, Canton, MI (US); Joseph Zane, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 182 days.

(21) Appl. No.: 17/932,906

(22) Filed: Sep. 16, 2022

(65) Prior Publication Data

US 2024/0095790 A1 Mar. 21, 2024

(51) Int. Cl.
*G06Q 30/0283* (2023.01)

(52) U.S. Cl.
CPC ................................. *G06Q 30/0284* (2013.01)

(58) Field of Classification Search
CPC .................................................. G06Q 30/0284
See application file for complete search history.

(56) References Cited

U.S. PATENT DOCUMENTS 8,140,265 B2 3/2012 Grush
10,832,570 B1 * 11/2020 Ibrahim ........... G08G 1/096838

2009/0143966 A1 * 6/2009 Jacobson ............... G08G 1/052
701/119
2011/0218896 A1 9/2011 Tonnon et al.
2015/0332519 A1 * 11/2015 Hiura ....................... G07C 5/08
701/33.4
2017/0032589 A1 2/2017 Zagajac et al.
2021/0183175 A1 6/2021 Dunger
2021/0397744 A1 * 12/2021 Pechersky ........... H04L 63/1408
2022/0319312 A1 * 10/2022 Mintz ................. G07B 15/063
2023/0298388 A1 * 9/2023 Van Duren ............ G07B 13/00
705/71

OTHER PUBLICATIONS

Forkenbrock, David, "Mileage-Based Road User Charge Concept", Transportation Research Record: Journal of the Transportation Research Board, 1864(1), 1-8. (Year: 2004).*

(Continued)

*Primary Examiner* — Jeff Zimmerman
*Assistant Examiner* — Wayne S. Murray
(74) *Attorney, Agent, or Firm* — Joseph Zane; Brooks Kushman P.C.

(57) ABSTRACT

A sum report is generated for each vehicle of a plurality of vehicles, the respective sum report indicating an account of the vehicle to be charged and a total sum owed by the vehicle. An aggregate report is generated indicating total amounts owed to each of a plurality of charger domains across the plurality of vehicles without indicating the accounts of the vehicles. The sum reports and the aggregate report are sent to a RUC service provider, the RUC service provider being configured to charge the vehicles using the sum reports and credit the charger domains using the aggregate report, while being unable to determine which routes were taken by the vehicles.

20 Claims, 10 Drawing Sheets

(56)     References Cited

OTHER PUBLICATIONS

Balasch, J., "PrETP: Privacy-Preserving Electronic Toll Pricing", USENIX Security (Year: 2010).*
Aggregating VMT within Predefined Geographic Zones by Cellular Assignment: A Non-GPS-Based Approach to Mileage-Based Road Use Charging, Final Report, prepared by Brian Davis and Max Donath, Dept. of Mechanical Engineering, University of Minnesota.

* cited by examiner

1100

START

Receive Map and Fees Information
to Vehicle
1102

Periodically Generate Charge
Information by the Vehicle
1104

Send the Charge Information
for Processing
1106

END

1200

START

Send Map and Fees information
to Vehicles
1202

Periodically Receive Charge Information
from the Vehicles
1204

Accumulate Value per Periodic Cycle
1206

Distribute Value to RUC Chargers
1208

1300

Computing Device
1302

PRIVACY-PRESERVING ROAD USAGE CHARGING REPORTS

TECHNICAL FIELD

Aspects of the disclosure generally relate to privacy-preserving road usage charging report.

BACKGROUND

Road usage charging (RUC), sometimes referred to as vehicle miles traveled (VMT) fees or mileage-based user fees (MBUF), is a policy whereby motorists pay for use of the roadway network as a function of distance traveled. VMT may not be the only input to fee computation, as time-of-day or time spent on the road may be an input to the fee calculation as well.

As with tolling, RUC is a direct user fee that supports a "user pays" principle of transportation funding, as well as the notion of managing road networks as utilities. Whereas toll systems are generally deployed on one or several facilities, such as an expressway corridors, bridges, or tunnels, road usage charges may apply to all roads in a defined jurisdiction or geography at all times. RUC can be implemented using a wide range of approaches, from paper licenses and odometer readings to automated technologies, such as in-vehicle devices and telematics systems built into vehicles.

SUMMARY

In one or more illustrative examples, a system for privacy-preserving RUC is provided. A secure application cloud includes one or more hardware devices, programmed to execute a RUC application cloud part of a RUC application to perform operations including to generate a sum report for each vehicle of a plurality of vehicles, the respective sum report indicating an account of the vehicle to be charged and a total sum owed by the vehicle; generate an aggregate report, the aggregate report indicating total amounts owed to each of a plurality of charger domains across the plurality of vehicles without indicating the accounts of the vehicles; and send the sum reports and the aggregate report to a RUC service provider, the RUC service provider being configured to charge the vehicles using the sum reports and credit the charger domains using the aggregate report, while being unable to determine which routes were taken by the vehicles.

In one or more illustrative examples, a system for privacy-preserving RUC is provided. The system includes a vehicle comprising one or more hardware devices, programmed to execute a RUC application to perform operations including to: periodically generate a sum report indicating an account of the vehicle to be charged and a total sum owed by the vehicle; periodically generate an aggregate report indicating total amounts owed to each of a plurality of charger domains by the vehicle without indicating the account of the vehicle; and periodically send the sum report and the aggregate report to a RUC service provider, the RUC service provider being configured to charge the vehicle using the sum reports and credit the charger domains using the aggregate report.

In one or more illustrative examples, a method for privacy-preserving RUC is provided. By a secure application cloud comprising one or more hardware devices executing a RUC application cloud part of a RUC application, the method includes generating a sum report for each vehicle of a plurality of vehicles, the respective sum report indicating an account of the vehicle to be charged and a total sum owed by the vehicle; generating an aggregate report, the aggregate report indicating total amounts owed to each of a plurality of charger domains across the plurality of vehicles without indicating the accounts of the vehicles; and sending the sum reports and the aggregate report to a RUC service provider, the RUC service provider being configured to charge the vehicles using the sum reports and credit the charger domains using the aggregate report, while being unable to determine which routes were taken by the vehicles.

In one or more illustrative examples, a method for privacy-preserving road usage charging is provided. By a vehicle comprising one or more hardware devices, the method includes executing a RUC application to perform operations including periodically generating a sum report indicating an account of the vehicle to be charged and a total sum owed by the vehicle; periodically generating an aggregate report indicating total amounts owed to each of a plurality of charger domains by the vehicle without indicating the account of the vehicle; and periodically sending the sum report and the aggregate report to a RUC service provider, the RUC service provider being configured to charge the vehicle using the sum reports and credit the charger domains using the aggregate report.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With growing interest in sustainable and equitable methods of paying for maintenance and operations of transport infrastructure, and in the face of declining fuel tax revenues, worldwide interest in road usage charging programs has grown significantly. Thus, it may be desirable to provide enhanced capabilities for determining usage of the infrastructure.

The same fee may not apply to all road infrastructure. Therefore, it may be useful for the vehicle to obtain combined location and fee information to properly compute a RUC. This location and fee information may have a wide range of fidelity. Agencies or chargers may provide relatively coarse location information to which a certain fee applies; however, it is unlikely that the agencies will provide fee information for every road and street. Instead, one approach is to utilize geo-polygons that define a particular fee regime. In addition to polygons or areas, corridors may be specified since chargers have expressed desire for separately pricing specific roads.

While charging geometries may not be at the finest level of geographic detail, the partitioning may still allow third parties opportunities to infer trip patterns from individual users. Also, chargers may require information with respect to how many miles were traveled on each pricing geometry (e.g., charging jurisdiction) to appropriate the correct funds to the geometry. Thus, a tradeoff exists between preserving user privacy and allowing chargers to allocated appropriate funding for road maintenance and repair.

Aspects of the disclosure address this tradeoff by provides a solution satisfying both constraints. The disclosed approach provides information needed for the chargers to allocate funds, where the users only provide amount charged information traceable to their account.

Figure 1:
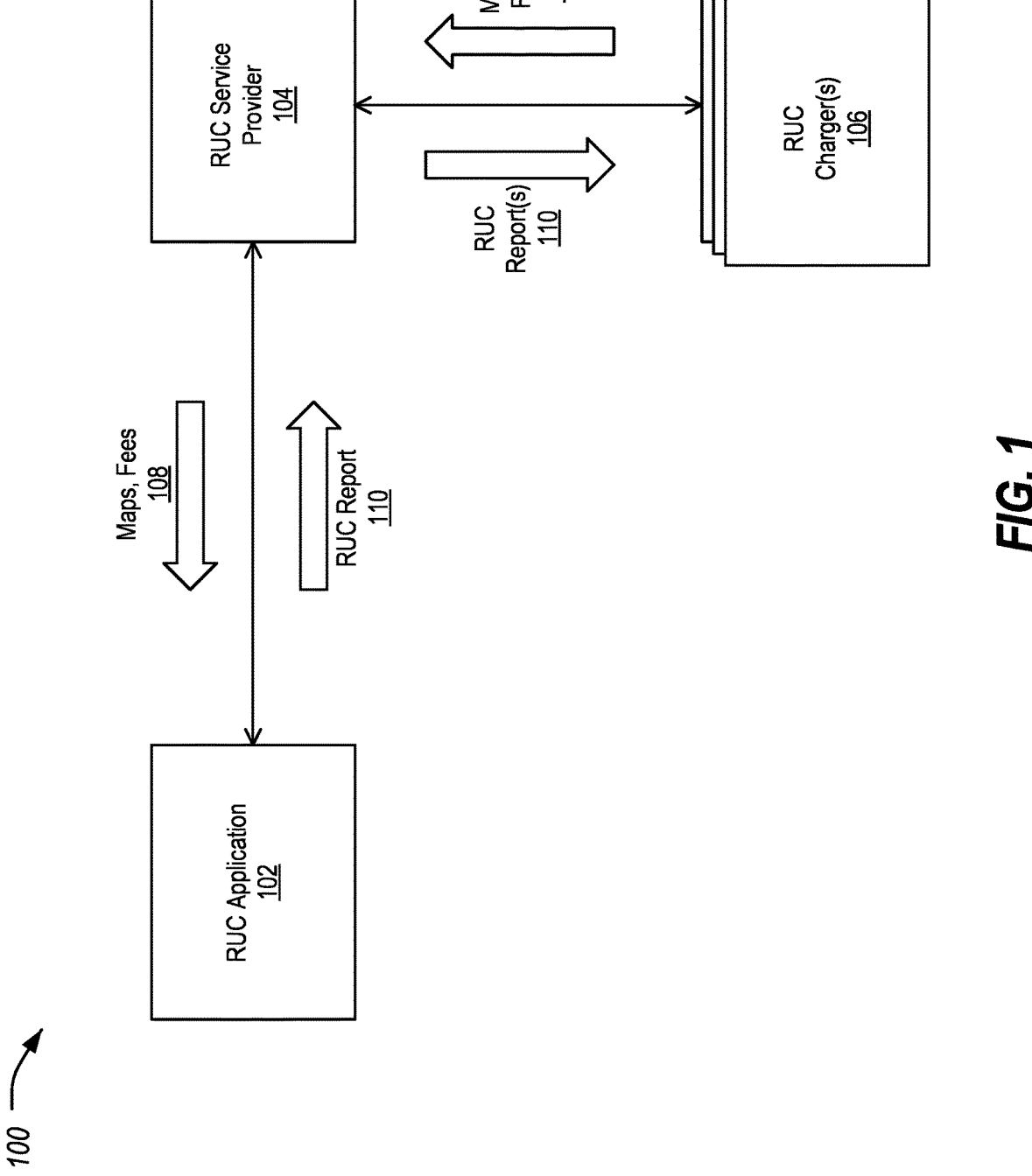
FIG. 1 illustrates an example system for performing privacy-preserving RUC reporting.

FIG. 1 illustrates an example system 100 for performing privacy-preserving RUC reporting. As shown, the system 100 includes a RUC application 102, in communication with a RUC service provider 104. In turn, the RUC service provider 104 is in communication with one or more RUC chargers 106. The RUC chargers 106 may be configured to provide map and fees information 108 to the RUC service provider 104. The RUC service provider 104 may receive the map and fees information 108 from one or more of the RUC chargers 106 to forward along to the RUC application 102. The RUC application 102 may provide RUC reports 110 to the RUC service provider 104, which in turn the RUC service provider 104 may forward to the appropriate RUC charger(s) 106.

The map and fees information 108 may include information descriptive of the fees owed per charging area and/or charging domain that a vehicle may traverse. This may include, in an example, data tables descriptive of the road geometry of the domains and fee tables for traversal of the indicated areas. The map and fees information 108 may further include information with respect to which roadways incur a charge for traversal and which do not. The map and fees information 108 may further include information with respect to which roads are private roads, which are dirt roads, as well as which may incur a charge differently or not at all as compared to other roadways. The map and fees information 108 may also indicate which are RUC-exempted roads/lanes, and which areas are off-road locations that may not be included in distance traveled measurements. Accordingly, the map and fees information 108 may allow the RUC application 102 to compute a total charge owed by the vehicle. Periodically, or triggered by an event, the RUC application 102 may send the RUC report 110 to the RUC service provider 104.

The RUC report 110 may include information to allow for the vehicle to be charged. This may include, for example, an account identifier to be charged the amount owed for the reporting period detailed by the RUC report 110. The account identifier may identify, as some examples, an account of the occupant corresponding to the vehicle and/or an account of an occupant of the vehicle. The RUC report 110 may also include other information, such as a total distance traveled and/or a distance traveled per charger domain. Based on the RUC report 110, the RUC service provider 104 may charge the vehicle and may provide funding to the different RUC chargers 106 corresponding to the fees incurred in each charging domain.

Figure 2:
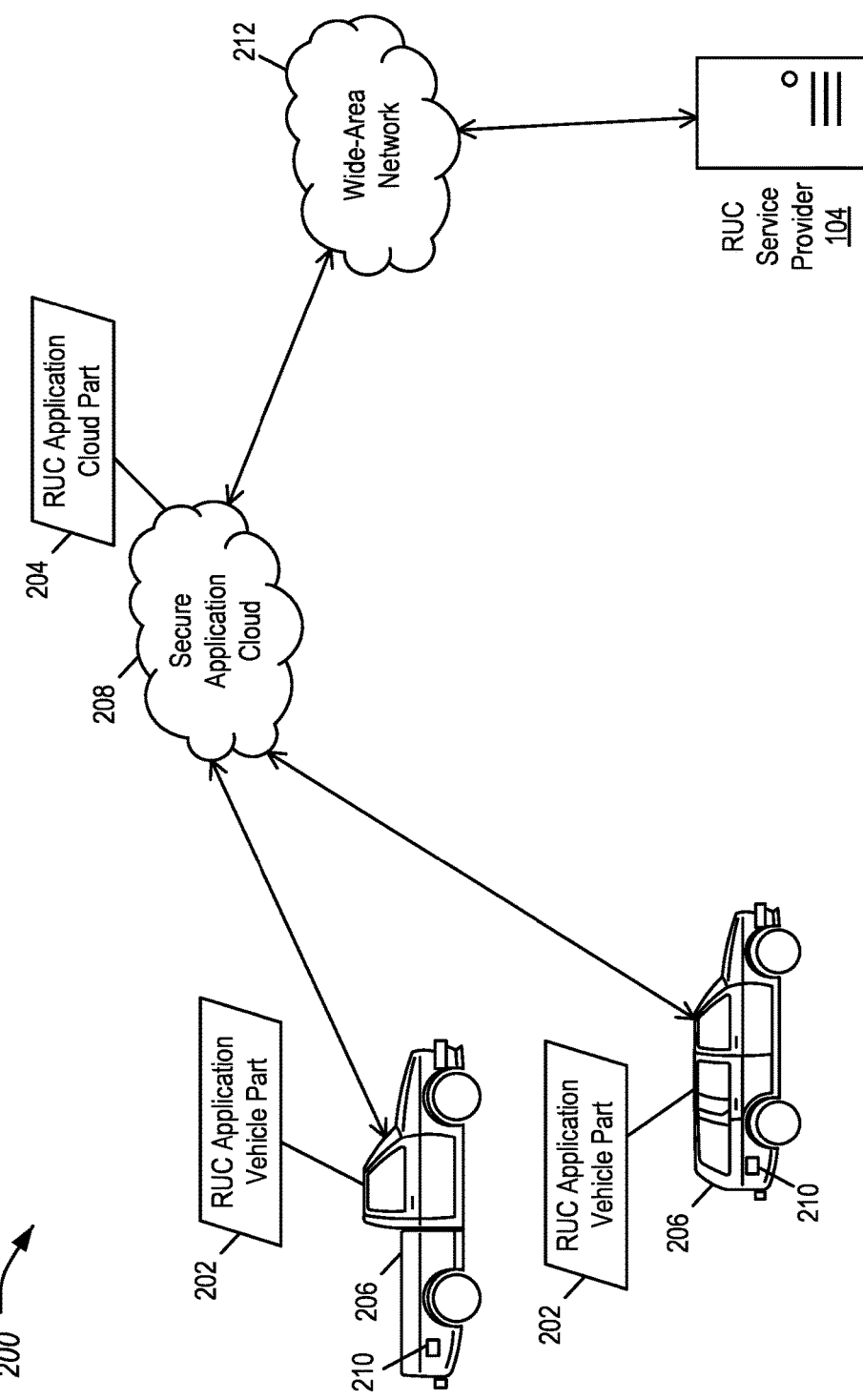
FIG. 2 illustrates an example RUC architecture diagram with the RUC application implemented as a RUC application vehicle part and a RUC application cloud part.

FIG. 2 illustrates an example RUC architecture 200 with the RUC application 102 implemented as a RUC application vehicle part 202 and a RUC application cloud part 204. The RUC application vehicle part 202 may be executed by the controllers of a vehicle 206. The RUC application cloud part 204 may be executed by one or more servers or other computing devices of an secure application cloud 208.

The vehicle 206 may be any of various types of automobile, crossover utility vehicle (CUV), sport utility vehicle (SUV), truck, recreational vehicle, boat, plane or other mobile machine for transporting people or goods. Such vehicles 206 may be human-driven or autonomous. In many cases, the vehicle 206 may be powered by an internal combustion engine. As another possibility, the vehicle 206 may be a battery electric vehicle (BEV) powered by one or more electric motors. As a further possibility, the vehicle 206 may be a hybrid electric vehicle (HEV) powered by both an internal combustion engine and one or more electric motors. As the type and configuration of vehicle 206 may vary, the capabilities of the vehicle 206 may correspondingly vary. As some other possibilities, vehicles 206 may have different capabilities with respect to passenger capacity, towing ability and capacity, and storage volume. For title, inventory, and other purposes, vehicles 206 may be associated with unique identifiers, such as vehicle identification numbers (VINs).

The vehicle 206 may include a plurality of controllers (not shown) configured to perform and manage various vehicle 206 functions under the power of the vehicle battery and/or drivetrain. One or more data buses may include various methods of communication available between the controllers, as well as between a telematics control unit (TCU) 210 and the controllers. Using the controllers, the TCU 210 may be able to monitor various information, such as the current location of the vehicle 206 (e.g., via a global navigation satellite system (GNSS)), the distance traveled by the vehicle 206, the road and/or lane being traversed by the vehicle 206, progress along a route being traversed by the vehicle 206, etc.

The TCU 210 may include network hardware configured to facilitate communication between the controllers of the vehicle 206 and with other devices of the system 100. For example, the TCU 210 may include or otherwise access a modem configured to facilitate communication over the secure application cloud 208 and/or a wide-area network 212 such as the Internet. The TCU 210 may, accordingly, be configured to communicate over various protocols, such as over a network protocol (such as Uu). The TCU 210 may, additionally, be configured to communicate over a broadcast peer-to-peer protocol (such as PC5), to facilitate cellular vehicle-to-everything (C-V2X) communications with devices such as other vehicles 206. It should be noted that these protocols are merely examples, and different peer-to-peer and/or cellular technologies may be used.

The secure application cloud 208 may include various private computing resources configured to provide services to the vehicle 206. In an example, the vehicle 206 may utilize the TCU 210 to connect to a network access point name (APN) for vehicle applications that utilize remote computing assistance. The secure application cloud 208 may connect to the wide-area network 212 through a gateway, providing access to other devices on the wide-area network 212, such as the RUC service provider 104.

In FIG. 2 the interface between the RUC application 102 and the RUC service provider 104 is implemented on both the vehicle 206 and the secure application cloud 208. Collectively, the RUC application vehicle part 202 and the RUC application cloud part 204 may perform the operations of the RUC application 102. This may include to receive the map and fees information 108 from the RUC service provider 104 and send the RUC reports 110 or other information related to the vehicle's roadway usage to the RUC service provider 104.

Figure 3:
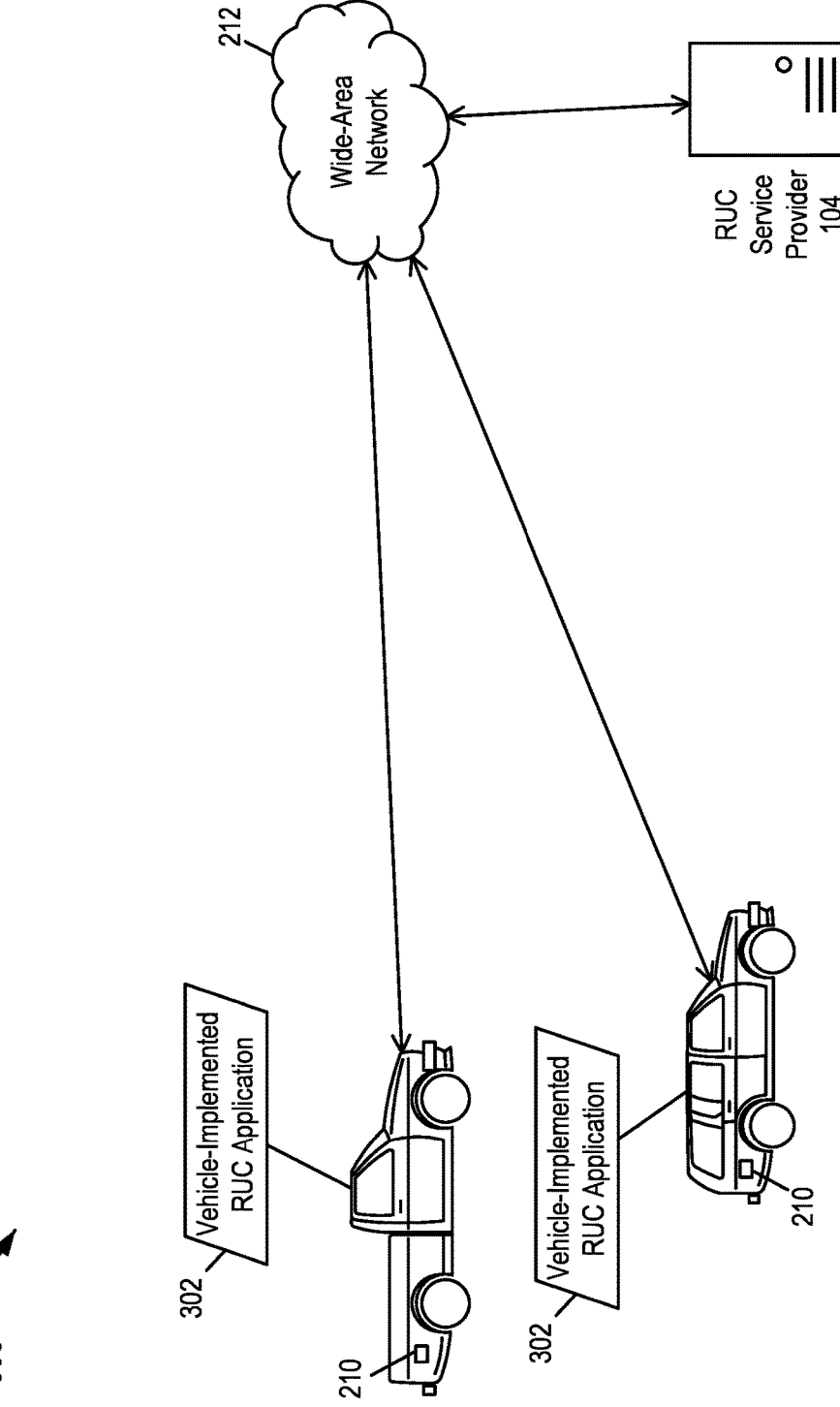
FIG. 3 illustrates an alternate example RUC architecture diagram with the RUC application implemented as a vehicle-implemented RUC application.

FIG. 3 illustrates an alternate example RUC architecture 300 with the RUC application 102 implemented as a vehicle-implemented RUC application 302. Similar to the RUC application vehicle part 202, the vehicle-implemented RUC application 302 may be executed by the controllers of the vehicle 206. In the alternative architecture shown in FIG. 3, the interface between the RUC application 102 and the RUC service provider 104 is implemented on the vehicle 206 alone. Here, the vehicle 206 may connect to the wide-area network 212 to access the RUC service provider 104, without using the services of the secure application cloud 208.

In either RUC architecture 200 and 300, the RUC application 102 corresponding to an individual vehicle 206 may collect, over a time period, total distance traveled in each charging domain. Based on the fee table provided by the RUC service provider 104 in the map and fees information 108, RUC application 102 may compute the RUC report 110. For instance, the amount owed may be computed as the distance traveled in the charging domain, times the fee for travel per unit distance. Or, the amount owed may be computed as the time spent in the charging domain, times the fee for presence per unit time. It should also be noted that the RUC reports 110 may discount private roads, dirt roads, RUC-exempted roads/lanes as marked on the map and off-road drives from the distance traveled measurements, if so specified by the map and fees information 108. An example RUC report 110 is shown in Table 1.

TABLE 1

| RUC report User Account Account X | | |
| --- | --- | --- |
| Charge Domain | Amount owed | Distance traveled |
| C1 | X1 | M1 |
| C2 | X2 | M2 |
| . . . | . . . | . . . |
| Cn | Xn | Mn |

A user having "Account X" may send the RUC report 110 to the RUC service provider 104 conveying the information from Table 1. However, the information included in the RUC report 110 may be sufficiently descriptive that it could be used to deconstruct the user's trip pattern. For example, using knowledge of the road geometry of the charge domains, as well as the distance traveled information, a best fit travel path could be reconstructed.

Figure 4:
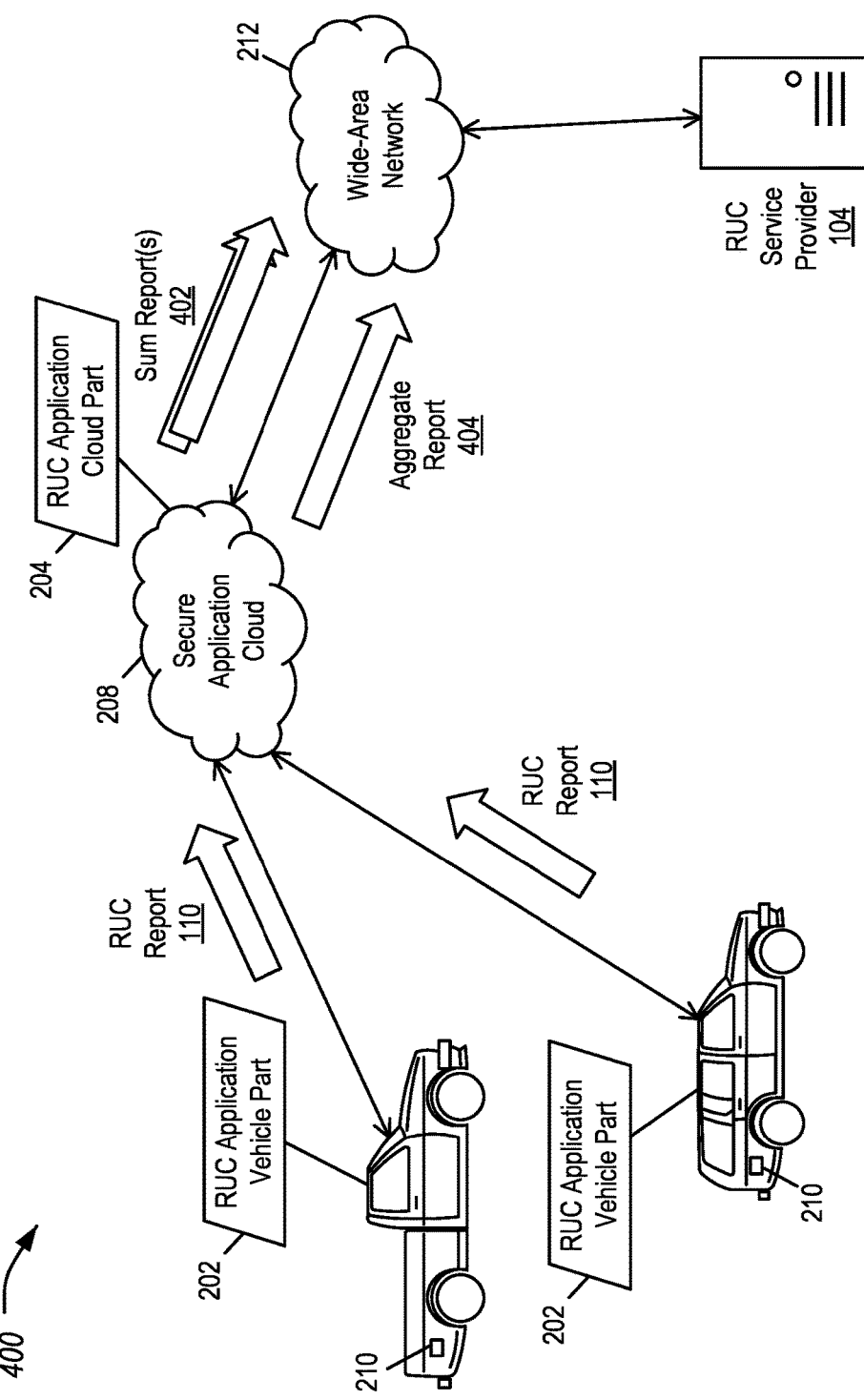
FIG. 4 illustrate an example of using the RUC architecture of FIG. 2 to increase privacy of the data included in the RUC report.

FIG. 4 illustrate an example 400 of using the RUC architecture 200 to increase privacy of the data included in the RUC report 110. In this example 400, the RUC application cloud part 204 may serve as an aggregator of messages coming from different RUC application vehicle part 202 instances. Each RUC application vehicle part 202 instance may provide a full RUC report 110 as indicated in Table 1.

The RUC application cloud part 204 of the RUC application 102 may utilize the RUC reports 110 received from the RUC application vehicle parts 202 to generate sum reports 402 and an aggregate report 404. The sum reports 402 may indicate the total sum owed by each vehicle 206. Table 2 illustrates an example sum report 402:

TABLE 2

| Sum Report User Account Identifier X | |
| --- | --- |
| Amount owed | $\Sigma(X1, X2, \ldots, Xn)$ |

The aggregate report 404 may indicate amounts owed to each of the RUC chargers 106 for all the vehicles 206 served by the RUC application cloud part 204. The aggregate report 404 may optionally also provide the distance traveled within the area served by each of the RUC chargers 106 across all the vehicles 206. Table 3 illustrates an example aggregate report 404:

TABLE 3

| Aggregate Report User Account Group (all) | | |
| --- | --- | --- |
| Charge Domain | Amount owed | Distance traveled (optional) |
| C1 | X1 + Y1 + . . . + Z1 | All distance in C1 |
| C2 | X2 + Y2 + . . . + Z2 | All distance in C2 |
| . . . | . . . | . . . |
| Cn | Xn + Yn + . . . + Zn | All distance in Cn |

The RUC application cloud part 204 may forward the sum reports 402 and the aggregate report 404 to the RUC service provider 104. The RUC service provider 104 may, in turn, use the sum reports 402 to charge the vehicles 206 the amount specified by the sum reports 402. The RUC service provider 104 may also use the aggregate report 404 to allocate the received revenue to the RUC chargers 106.

Thus, in the example 400, the RUC service provider 104 may be unable to determine which routes were taken by the vehicles 206, as the RUC service provider 104 is not informed of the distance traveled by each vehicle 206 within each charger area. However, in this approach detailed RUC reports 110 may still be available to the secure application cloud 208.

Figure 5:
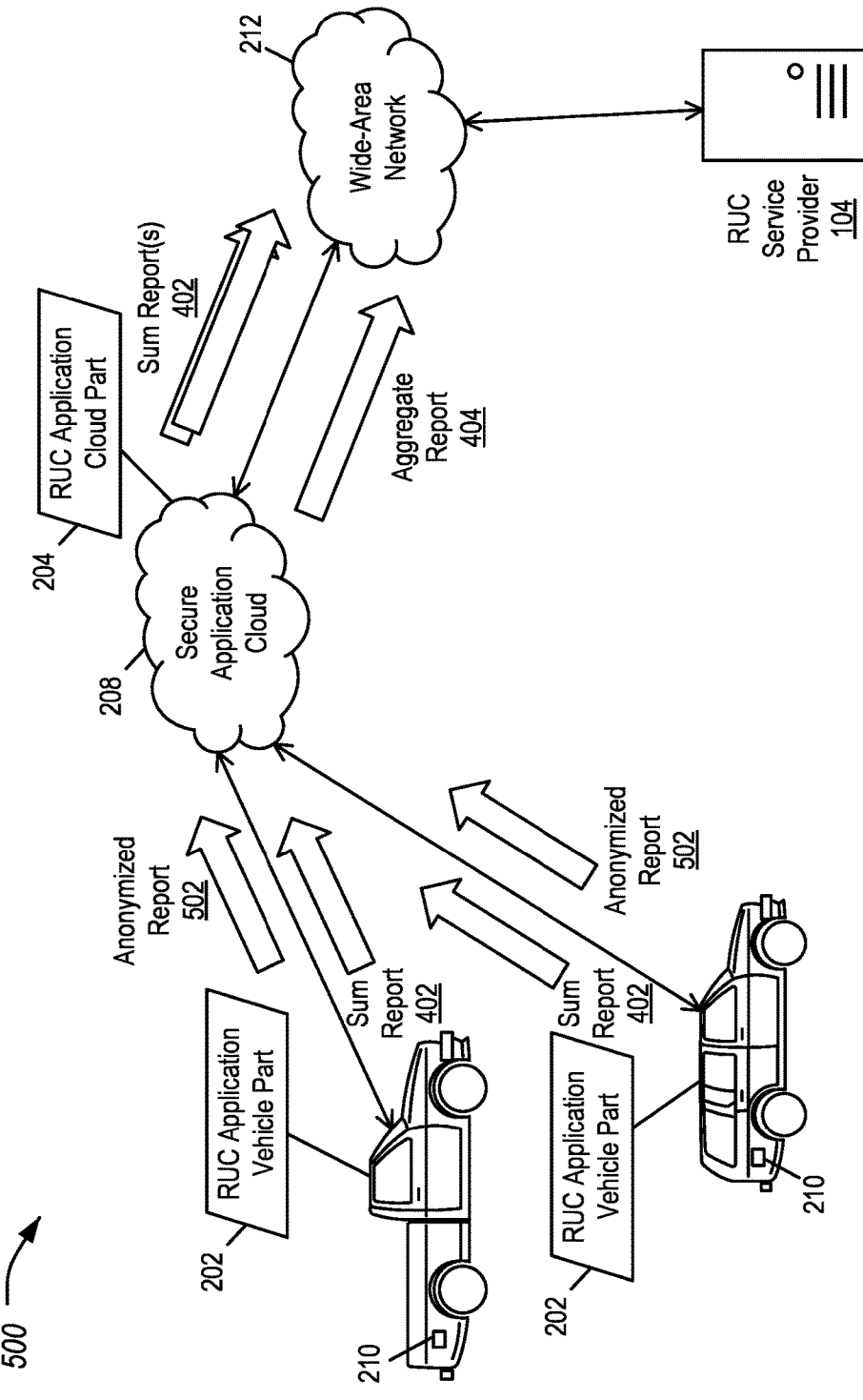
FIG. 5 illustrate an alternate example of using the RUC architecture of FIG. 2 to increase privacy of the data included in the RUC report.

FIG. 5 illustrate an alternate example 500 of using the RUC architecture 200 to increase privacy of the data included in the RUC report 110. As compared to the example 400 where the vehicles 206 each provide the raw RUC reports 110 to the RUC application cloud part 204, in this example 500 the RUC application vehicle part 202 provides two reports to the RUC application cloud part 204, the sum report 402 and an anonymized report 502.

The sum report 402 may indicate the total sum owed by each vehicle 206. However, in the example 500 the sum report 402 is computed by the RUC application vehicle part 202, not by the RUC application cloud part 204. An example sum report 402 generated by the vehicle 206 is shown in Table 4.

TABLE 4

| Sum Report User Account Identifier X | |
| --- | --- |
| Amount owed | $\Sigma(X1, X2 \ldots, Xn)$ |

The anonymized report 502 may indicate amounts owed to each of the RUC chargers 106 for the vehicle 206 as determined by the RUC application vehicle part 202. The anonymized report 502 may optionally also provide the distance traveled within the area served by each of the RUC chargers 106 for the vehicle 206. No identifier of the vehicle 206 or of a user account for the vehicle 206 is provided in the anonymized report 502, however. An example anonymized report 502 is shown in Table 5.

TABLE 5

| Anonymized Report User Account Anonymous | | |
| --- | --- | --- |
| Charge Domain | Amount owed | Distance traveled |
| C1 | X1 | M1 |
| C2 | X2 | M2 |
| ... | ... | ... |
| Cn | Xn | Mn |

In some examples, the anonymized report 502 may further be protected using vehicle-to-everything (V2X) certificates validation and encryption. Responsive to receiving, decrypting, and verifying the anonymized reports 502 from the RUC application vehicle parts 202 for the vehicles 206, the RUC application cloud part 204 may create the aggregate report 404, as shown in Table 3.

It should be noted that a key difference between the example 400 and the example 500 relates to private data sharing outside the vehicle 206. In the example 400, more private data is shared since the RUC report 110 with the account identifier is sent to the RUC application cloud part 204. In the example 500, the anonymized report 502 is sent without the account identifier. While lacking the account identifier, the anonymized reports 502 are still sufficient to allow the RUC application cloud part 204 to sum the amounts owed and distances traveled to create the aggregate report 404.

Figure 6:
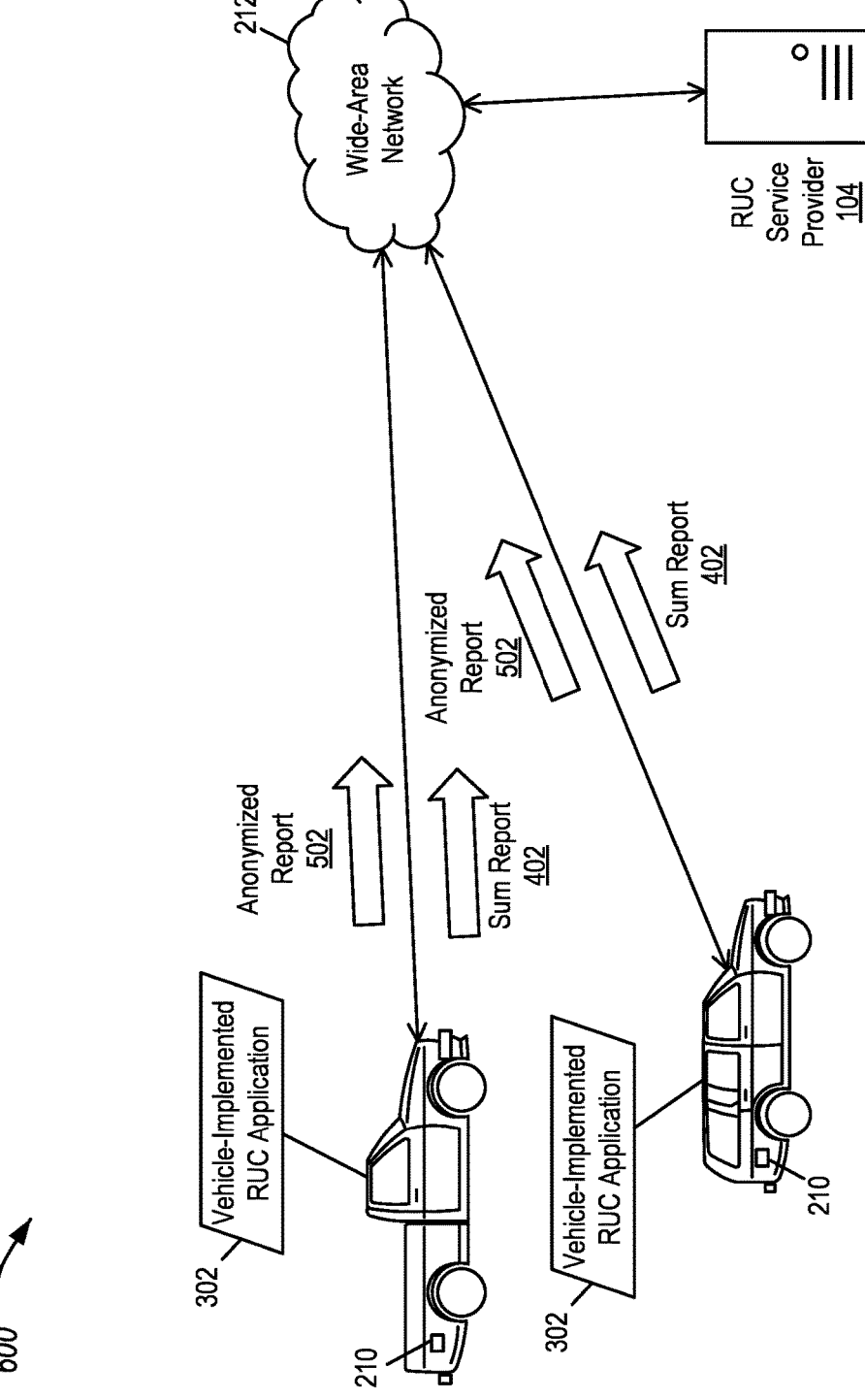
FIG. 6 illustrate an example of using the RUC architecture of FIG. 3 to increase privacy of the data included in the RUC report, without requiring use of the RUC application cloud part or the secure application cloud.

FIG. 6 illustrate an example 600 of using the RUC architecture 300 of FIG. 3 to increase privacy of the data included in the RUC report 110, without requiring use of the RUC application cloud part 204 or the secure application cloud 208. As opposed to the examples 400 and 500, in the example 600 the vehicle-implemented RUC application 302 sends the sum report 402 and the anonymized report 502 to the RUC service provider 104, without utilizing the services of the secure application cloud 208 as an intermediary.

It should be noted that, in the example 600, it may be possible for a receiver such as the RUC service provider 104 to correlate the sum reports 402 with the anonymized reports 502, as they may be for same time period and may accordingly indicate details of the same data. To decouple the anonymized report 502 and the sum report 402, the anonymized report 502 and the sum report 402 may be sent by the vehicle-implemented RUC application 302 at different times and/or covering different time periods. In doing so, the receiver may have difficulty in unmasking the travel routes, because the anonymized report 502 and the sum report 402 would not line up temporally.

Figures 7, 8:
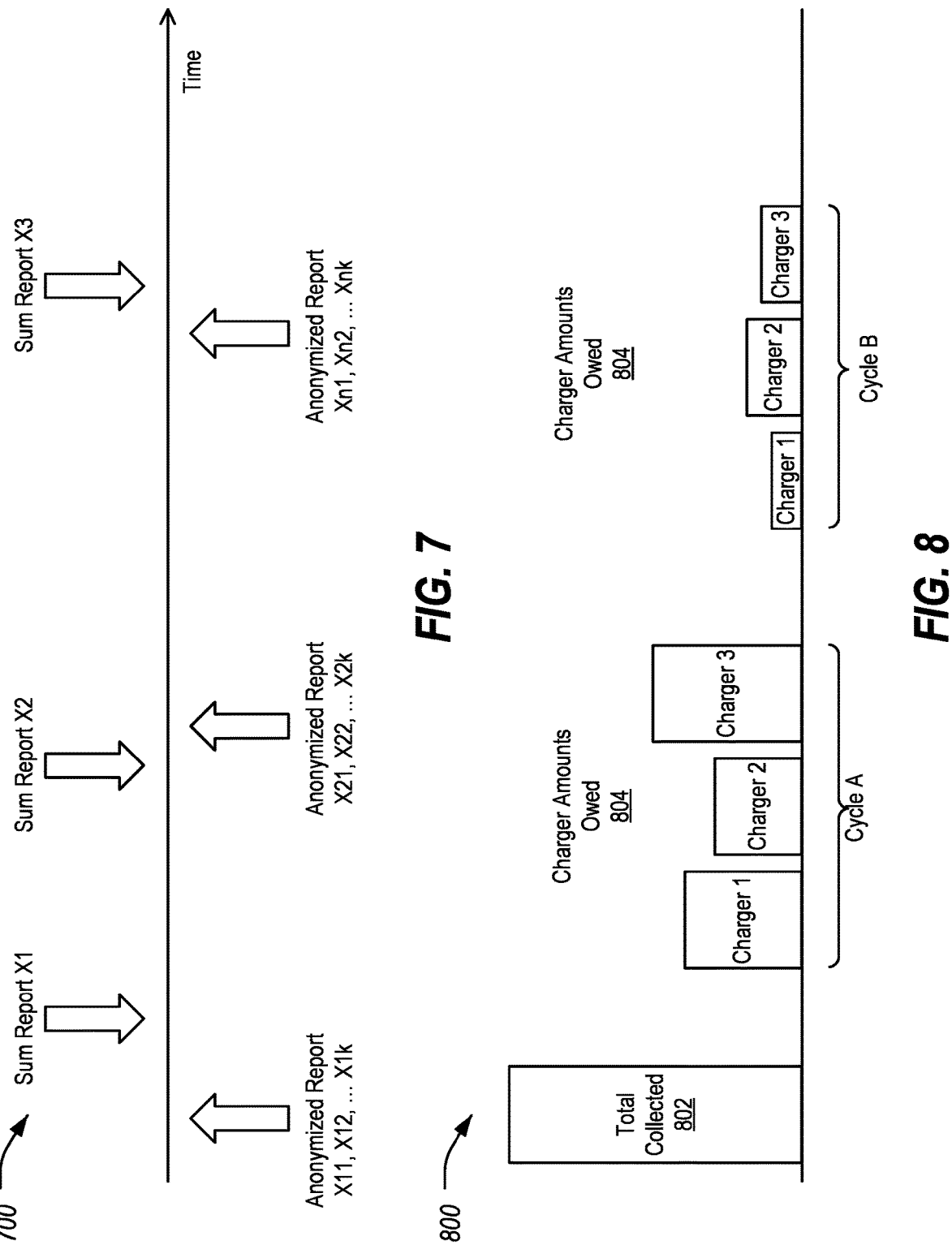
FIG. 7 illustrates an example of staggering between the sum reports and the anonymized reports.
FIG. 8 illustrates an example of two billing cycles.

FIG. 7 illustrates an example 700 of staggering between the sum reports 402 and the anonymized reports 502. The staggering may be performed by randomizing the sending of the sum reports 402 with respect to the sending of the anonymized reports 502. As shown, the vehicle-implemented RUC application 302 may schedule the sending of the sum report 402 as a random amount of time around the sending of the corresponding anonymized report 502. For some cycles, this may cause the sum report 402 to be sent before the anonymized report 502, while in other cycles the sum report 402 may be sent after the anonymized report 502. By doing so, it may be more difficult for a receiver of the reports to correlate the sum reports 402 with the anonymized reports 502. It should be noted that this is only one possible scheme for randomizing the sending of the sum reports 402 and the anonymized reports 502. For instance, the timing of the anonymized reports 502 may additionally or alternately be randomized.

In another aspect, the periods of the sending of the sum reports 402 and the anonymized reports 502 may also be varied. For instance, the sum reports 402 may be sent for a different time interval than the anonymized reports 502 (e.g., sum reports 402 every three weeks vs anonymized reports 502 every two weeks). By computing the sum reports 402 and the itemized anonymized reports 502 for different intervals, the travel paths of the vehicles 206 cannot be readily matched.

The RUC service provider 104 may manage the amount owed to each of the RUC chargers 106 as well as the total funds owed by each account based on the sum reports 402. For instance, the RUC service provider 104 may begin a charge cycle by accumulating the amount owed to each of the RUC chargers 106 based on the received anonymized reports 502. Responsive to occurrence of a trigger time (e.g., hourly, daily, weekly, monthly, etc.) the RUC service provider 104 may freeze the charge domain amounts owed. Any new itemized reports after the freeze may begin increasing the next cycle.

The RUC service provider 104 may also collect funds in accordance with the sum reports 402. An example of two billing cycles, A and B, is shown in FIG. 8. Also shown, an amount of total collected funds 802 has been received by the RUC service provider 104 based on the sum reports 402. Additionally, total charger amounts owed 804 to each RUC charger 106 are shown, based on the anonymized reports 502 for a first billing cycle A and a second billing cycle B.

The RUC service provider 104 may utilize the total collected funds 802 to pay the RUC chargers 106. To do so, the RUC service provider 104 may compare the total collected to be disbursed to the RUC chargers 106 with the total sum of itemized amounts owed. If there are enough funds to cover the itemized bill for the RUC chargers 106 for the cycle, funds may be released by the RUC service provider 104 to satisfy the total charger amounts owed 804 to the RUC chargers 106.

If there are insufficient funds to release to satisfy the RUC chargers 106 for the cycle, the RUC service provider 104 may wait until the total funds available can provide the sum owed, at which point the funds may be released to individual RUC chargers 106. Or, in an alternate example, the portion of funds that are available may be sent to the RUC chargers 106 in proportion to the amounts that are owed to the respective RUC chargers 106. By taking this alternate approach, the RUC chargers 106 may at least be paid a portion of the balances owed each cycle. When the funds are released to the RUC chargers 106, the total sum collected from the users may be decremented by the sum released. The remaining funds, if any, may be available for use in paying the RUC chargers 106 in future cycles.

Figures 9, 10:
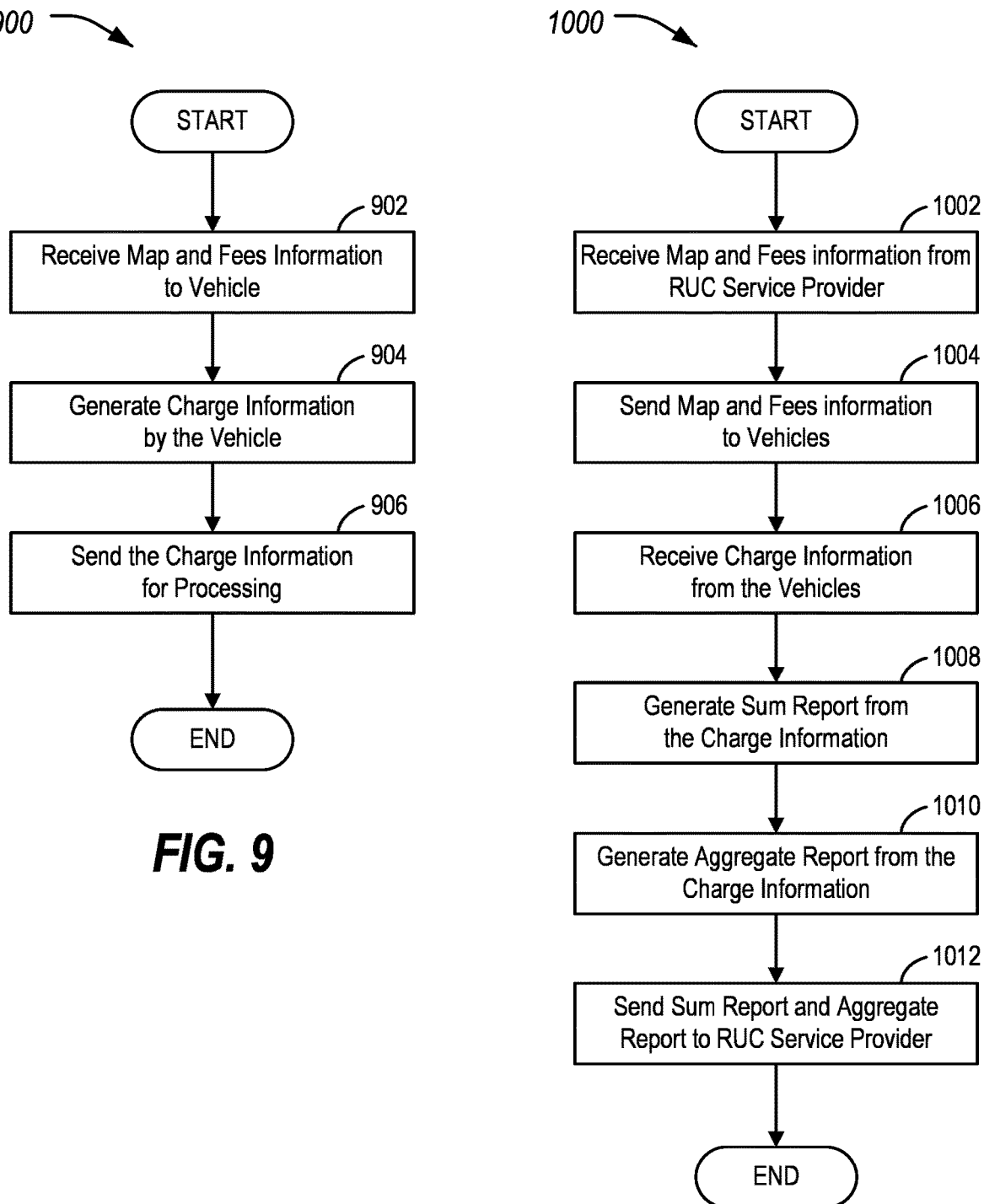
FIG. 9 illustrates an example process of aspects of performing privacy-preserving RUC by the RUC application vehicle part of the RUC application.
FIG. 10 illustrates an example process of aspects of performing privacy-preserving RUC by the RUC application cloud part of the RUC application.

FIG. 9 illustrates an example process 900 of aspects of performing privacy-preserving RUC by the RUC application vehicle part 202 of the RUC application 102. In an example, the RUC application vehicle part 202 may perform the operations of the process 900 in the context of the examples 400 or 500 as discussed in detail herein.

At operation 902, the RUC application vehicle part 202 receives the map and fees information 108. In an example, the RUC application vehicle part 202 may receive the map and fees information 108 from the RUC application cloud part 204. The map and fees information 108 may include data descriptive of road geometry and fee tables for traversal of roads within each of a plurality of charger domains.

At operation 904, the RUC application vehicle part 202 generates charge information. For instance, as shown in the example 400, the charge information may include RUC reports 110 specifying the account of the vehicle 206 to be charged, and for each of the plurality of charger domains, a distance traveled within the respective one of the plurality of charger domains and the amount owed by the vehicle 206 to the respective one of the plurality of charger domains. Table 1 illustrates an example RUC report 110 generated by the RUC application vehicle part 202.

In another possibility, as shown in the example 500, the charge information may include an anonymized report 502, indicating amounts owed to each of the charger domains for the vehicle 206; and a sum report 402, indicative a total amount owed by the vehicle 206 to plurality of charger domains and an identifier of the account of the vehicle 206. Table 4 illustrates an example sum report 402 generated by the RUC application vehicle part 202. Table 5 illustrates an example anonymized report 502 generated by the RUC application vehicle part 202.

At operation 906, the RUC application vehicle part 202 sends the charge information for processing. In an example, the TCU 210 of the vehicle 206 may send the charge information to the RUC application cloud part 204 via the secure application cloud 208 and/or the wide-area network 212. After operation 906, the process 900 ends.

FIG. 10 illustrates an example process 1000 of aspects of performing privacy-preserving RUC by the RUC application cloud part 204 of the RUC application 102. In an example, the RUC application cloud part 204 may perform the operations of the process 1000 in the context of the examples 400 or 500 discussed in detail herein.

At operation 1002, the RUC application cloud part 204 receives map and fees information 108 from the RUC service provider 104. The map and fees information 108 may include data descriptive of road geometry and fee tables for traversal of roads within each of a plurality of charger domains. The RUC service provider 104 may, in turn, receive the map and fees information 108 from RUC chargers 106 responsible for the charger domains.

At operation 1004, the RUC application cloud part 204 sends the map and fees information 108 to the vehicles 206. In some examples, the RUC application cloud part 204 may aggregate the map and fees information 108 forwarded from the RUC service provider 104 to generate map and fees information 108 that corresponds to the area in which the vehicles 206 are located. The RUC application cloud parts 204 may send the map and fees information 108 to the vehicles 206 via the secure application cloud 208, in an example. This information may be received by the vehicles 206, as explained at operation 902 of the process 900.

At operation 1006, the RUC application cloud part 204 receives charge information from the vehicles 206. In an example the charge information may be sent by the vehicles 206, as discussed above with respect to operation 906 of the process 900. In some examples, the charge information may include RUC reports 110, as explained in the example 400. In other examples, as explained in the example 500, the charge information may include the anonymized report 502, indicating amounts owed to each of the charger domains for the vehicle 206; and the sum report 402, indicative a total amount owed by the vehicle 206 to plurality of charger domains and an identifier of the account of the vehicle 206.

At operation 1008, the RUC application cloud part 204 generates the sum reports 402 from the charge information. The sum reports 402 may indicate, for each vehicle 206, an account of the vehicle 206 to be charged and a total sum owed by the vehicle 206. In an example, the RUC application cloud part 204 may determine the total sum owed by each vehicle 206 by totaling, for each vehicle 206, the amounts owed to each of the plurality of charger domains as specified by the charge information received from the vehicles 206. Table 2 illustrates an example sum report 402 generated by the RUC application cloud part 204.

At operation 1010, the RUC application cloud part 204 generates the aggregate report 404 from the charge information. The aggregate report 404 may indicate amounts owed to each of the RUC chargers 106 for all the vehicles 206 served by the RUC application cloud part 204. The aggregate report 404 may optionally also provide the distance traveled within the area served by each of the RUC chargers 106 across all the vehicles 206. Table 3 illustrates an example aggregate report 404 generated by the RUC application cloud part 204.

At operation 1012, the RUC application cloud part 204 sends the sum report 402 and the aggregate report 404 to the RUC service provider 104. In an example, the RUC application cloud part 204 may provide the sum report(s) 402 and the aggregate report 404 to the RUC service provider 104 over the wide-area network 212. As explained above, the RUC service provider 104 receiving the reports may be unable to determine which routes were taken by the vehicles 206, as the RUC service provider 104 is not informed of the distance traveled by each vehicle 206 within each charger area. After operation 1012, the process 1000 ends.

Figures 11, 12:
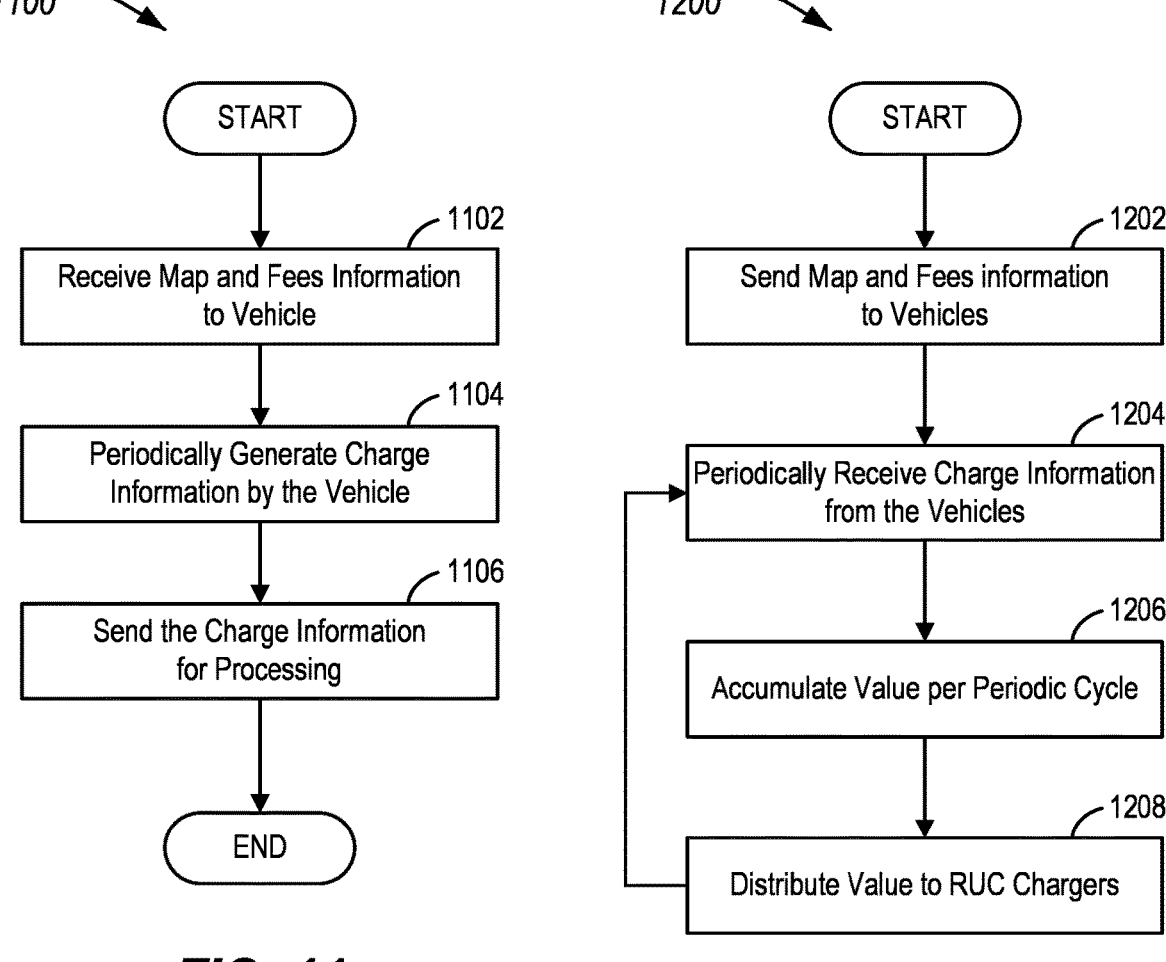
FIG. 11 illustrates an example process of aspects of performing privacy-preserving RUC by the vehicle-implemented RUC application.
FIG. 12 illustrates an example process for of aspects of performing privacy-preserving RUC by the RUC service provider in communication with the vehicle-implemented RUC application.

FIG. 11 illustrates an example process 1100 of aspects of performing privacy-preserving RUC by the vehicle-implemented RUC application 302. In an example, the vehicle-implemented RUC application 302 may perform the operations of the process 1100 in the context of the example 600, discussed in detail herein.

At operation 1102, the vehicle-implemented RUC application 302 receives the map and fees information 108 to the vehicle 206. In an example, the vehicle-implemented RUC application 302 may receive the map and fees information 108 from the RUC service provider 104. The map and fees information 108 may include data descriptive of road geometry and fee tables for traversal of roads within each of a plurality of charger domains.

At operation 1104, the vehicle-implemented RUC application 302 periodically generates charge information. For instance, as shown in the example 600, the vehicle-implemented RUC application 302 may generate the anonymized report 502 and the sum report 402. The anonymized report 502 may indicate amounts owed to each of the RUC chargers 106 for the vehicle 206 as determined by the RUC application vehicle part 202. The anonymized report 502 may optionally also provide the distance traveled within the area served by each of the RUC chargers 106 for the vehicle 206. No identifier of the vehicle 206 or of a user account for the vehicle 206 is provided in the anonymized report 502, however. The sum report 402 may indicate the total sum owed by the vehicle 206. An example sum report 402 is shown in Table 4. An example anonymized report 502 is shown in FIG. 5.

At operation 1106, the vehicle-implemented RUC application 302 sends the charge information for processing. In an example, the vehicle-implemented RUC application 302 periodically sends the sum report 402 and the aggregate report 404 to the RUC service provider 104. To decouple the anonymized report 502 and the sum report 402, the anonymized report 502 and the sum report 402 may be sent by the vehicle-implemented RUC application 302 at different times and/or covering different time periods. In doing so, a receiver may have difficulty in unmasking the travel routes as the anonymized report 502 and the sum report 402 would not line up temporally. After operation 1106 the process 1100 ends.

FIG. 12 illustrates an example process 1200 for of aspects of performing privacy-preserving RUC by the RUC service provider 104 in communication with the vehicle-implemented RUC application 302.

At operation 1202, the RUC service provider 104 sends the maps and fees information 108 to the vehicles 206. The map and fees information 108 may include data descriptive of road geometry and fee tables for traversal of roads within each of a plurality of charger domains. The RUC service provider 104 may, in turn, have received the map and fees information 108 from RUC chargers 106 responsible for the charger domains.

At operation 1204, the RUC service provider 104 periodically receives the charge information from the vehicles 206. In an example, the RUC service provider 104 receives the charge information sent by the vehicles 206 at operation 1106 of the process 1100. In an example, the charge information may include anonymized reports 502 and sum reports 402 generated by the vehicles 206.

At operation 1206, the RUC service provider 104 accumulates the value per periodic cycle of the receipt of charge information from the vehicles 206. In an example, the RUC service provider 104 may utilize the account and total information in the sum reports 402 to collect the value incurred to the vehicles 206 for traveling along the roadways managed by the RUC chargers 106. The RUC service provider 104 may maintain the total collected funds 802 as a sum of the accumulated charges based on the sum reports 402.

Additionally, the RUC service provider 104 may accumulate the total charger amounts owed 804 to each of the RUC chargers 106 based on the received anonymized reports 502. Responsive to occurrence of a trigger time completing the cycle (e.g., hourly, daily, weekly, monthly, etc.) the RUC service provider 104 may freeze the total charger amounts owed 804. Any new anonymized reports 502 received after the freeze may begin increasing total charger amounts owed 804 for the next cycle.

At operation 1208, the RUC service provider 104 distributes value to the RUC chargers 106. One or more approaches may be used to distribute the value.

For instance, the RUC service provider 104 may utilize the total collected funds 802 to pay the RUC chargers 106. To do so, the RUC service provider 104 may compare the total collected to be disbursed to the RUC chargers 106 with the total sum of itemized amounts owed. If there are enough funds to cover the itemized bill for the RUC chargers 106, funds may be released by the RUC service provider 104 to satisfy the total charger amounts owed 804 to the RUC chargers 106.

If there are insufficient funds to release, the RUC service provider 104 may wait until the total funds available can provide the sum owed, at which point the funds may be released to individual RUC chargers 106. Or, if there are insufficient funds, the portion of funds that are available may be send to the RUC chargers 106 in proportion to the amounts that are owed to the respective RUC chargers 106. By taking this approach, the RUC chargers 106 may at least be paid a portion of the balances owed each cycle.

When the funds are released to the RUC chargers 106, the total sum collected from the users may be decremented by the sum released. The remaining funds, if any, may be available for use in paying the RUC chargers 106 in future cycles. After operation 1208, control returns to operation 1204.

It should be noted, with respect to the processes 900-1200, that while various operations are shown as discrete operations and in a specific order, this is only one example and one or more operations of the processes 900-1200 may be performed concurrently or in a different ordering than as shown. Moreover, while aspects of the processes 900-1200 are shown with a starting and an ending, the processes 900-1200 may be performed continually in a loop wise manner.

Variations on the disclosed concepts are possible. In an example, a road usage charge type may additionally be utilized that specifies different types of road usage charges that are incurred for given geography. The map and fees information 108 may indicate which road usage charge types applies to what roads or other geographical areas.

A first road usage charge type may indicate area-based charging. In an example, an area-based charging scheme may indicate a first charge that is incurred for use of a public road, and a second charge that is incurred for use of a private road. In another example, an area-based charging scheme may specify rules, sub-rules, and/or zones that indicate how usage charges are applies to the vehicle 206 based on the area where the vehicle 206.

A second road usage charge type may indicate road segment-based charging. In an example, different charges may be specified per road segments and/or per road corridor. In another example, charges may be specified in terms of distance traveled per certain road segment.

A third road usage charger type may indicate time-based charging. In an example, different charges may be specified for use of a roadway based on calendar time (week, month, year, etc.). In another example, charges may be incurred based on engine run time or time spent on a road segment or corridor.

The RUC application 102 may include the road usage charge type in the RUC report 110 to indicate which type of road usage charge is indicated. An example RUC report 110 having an additional column for road usage charge type is shown in Table 6.

TABLE 6

| Charge Domain | Amount owed | Distance traveled | Road Usage Charge Type |
|---|---|---|---|
| Modified RUC report including Road Usage Charge Type User Account Account X Start time (of the report) Tstart End Time (of the report) Tend Amount Owed Total Amount owed for period of the report | | | |
| C1 | X1 | M1 | A1 |
| C2 | X2 | M2 | A2 |
| . . . | . . . | . . . | . . . |
| Cn | Xn | Mn | An |

The modified RUC report 110 may be provided in multiple versions. For instance, if the Charge Domain rows are included, then the amount owed and account identifier may be excluded to preserve user privacy (e.g., by providing null values or by omitting those rows). Or, if the Charge Domain rows are not included, then the amount owed and account identifier information may be provided in the RUC report 110. It should also be noted that the specific columns may vary between implementations. For instance, in some implementations the Road Usage Charge Type may be optional and/or omitted.

By including the road usage charge type in the RUC report 110, the system 100 may benefit both the RUC service provider 104 and also the RUC chargers 106 by allowing for differentiated road usage charge types to be specified in the sum reports 402 and/or the anonymized reports 502.

For example, the RUC application 102, either on the vehicle 206 or on the secure application cloud 208, may perform segregation with respect to the road usage charge type when reporting. As one possibility, charges that relate to a specific road usage charge type may be sent to a RUC charger 106 configured to handle that specific road usage charge type. For instance, if the road usage charge type is segment based, it would be classified as segment and anonymized so that RUC charger 106 knows that this is for segment based, etc., similarly the same applies for all the above road usage charge types.

Various configurable aspects may be supported by using the road usage charge types. For instance, the RUC service provider 104 may charge the vehicle 206 based on the RUC charge type or types to which the vehicle 206 is subscribed. Or, RUC Service provider 104 might sell multiple RUC services for different road usage charge types, which may be based on the customer preference for how to be charged for road usage.

Figure 13:
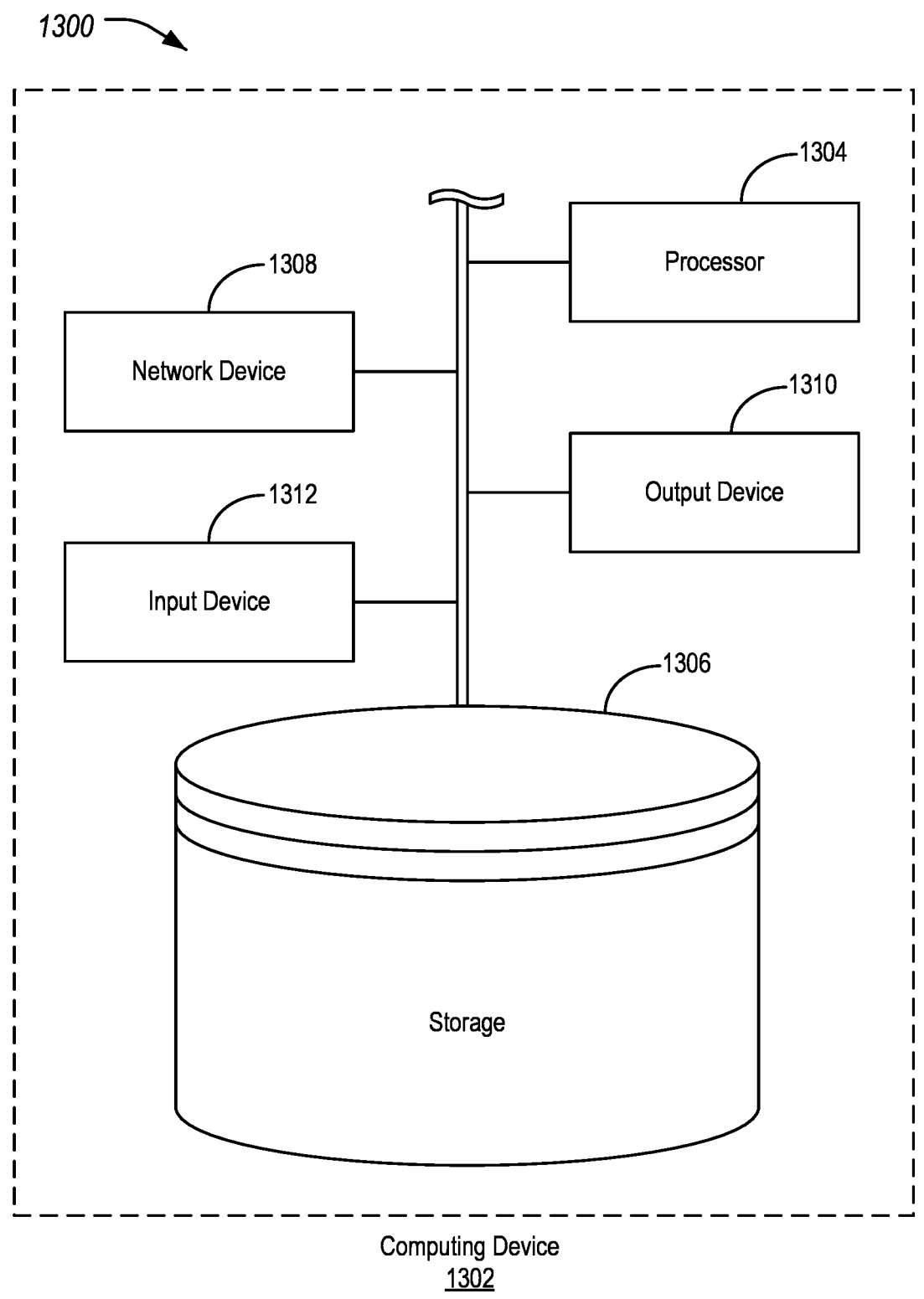
FIG. 13 illustrates an example of a computing device for use in privacy-preserving road usage charging.

FIG. 13 illustrates an example 1300 of a computing device 1302 for use in privacy-preserving road usage charging. Referring to FIG. 13, and with reference to FIGS. 1-12, the RUC service provider 104, RUC charger 106, vehicle 206, secure application cloud 208, TCU 210, wide-area network 212, etc., may include examples of such computing devices 1302. As shown, the computing device 1302 may include a processor 1304 that is operatively connected to a storage 1306, a network device 1308, an output device 1310, and an input device 1312. It should be noted that this is merely an example, and computing devices 1302 with more, fewer, or different components may be used.

The processor 1304 may include one or more integrated circuits that implement the functionality of a central processing unit (CPU) and/or graphics processing unit (GPU). In some examples, the processors 1304 are a system on a chip (SoC) that integrates the functionality of the CPU and GPU. The SoC may optionally include other components such as, for example, the storage 1306 and the network device 1308 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 1304 executes stored program instructions that are retrieved from the storage 1306. The stored program instructions, accordingly, include software that controls the operation of the processors 1304 to perform the operations described herein. The storage 1306 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 1310. The output device 1310 may include a graphical or visual display device, such as an electronic display screen, projector, printer, or any other suitable device that reproduces a graphical display. As another example, the output device 1310 may include an audio device, such as a loudspeaker or headphone. As yet a further example, the output device 1310 may include a tactile device, such as a mechanically raiseable device that may, in an example, be configured to display braille or another physical output that may be touched to provide information to a user.

The input device 1312 may include any of various devices that enable the computing device 1302 to receive control input from users. Examples of suitable input devices that receive human interface inputs may include keyboards, mice, trackballs, touchscreens, voice input devices, graphics tablets, and the like.

The network devices 1308 may each include any of various devices that enable the TCU 210, secure application cloud 208, RUC service provider 104, and RUC charger 106 to send and/or receive data from external devices over networks (such as the wide-area network 212). Examples of suitable network devices 1308 include an Ethernet interface, a Wi-Fi transceiver, a cellular transceiver, a satellite transceiver, a V2X transceiver, a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for privacy-preserving road usage charging (RUC) comprising:

a secure application cloud comprising one or more hardware devices, programmed to execute a RUC application cloud part of a RUC application to perform operations including to:

generate a sum report for each vehicle of a plurality of vehicles, the respective sum report indicating an account of the vehicle to be charged and a total sum owed by the vehicle;

generate an aggregate report, the aggregate report indicating total amounts owed to each of a plurality of charger domains across the plurality of vehicles without indicating the accounts of the vehicles;

randomize timing and/or interval of transmission of the sum reports and the aggregate report, such that the sum reports and the aggregate report are sent at different times and cover different times, and the total sums owed by the plurality of vehicles from the sum reports and the total amounts owed to each of a plurality of charger domains from the aggregate report cover different time intervals that do not line up temporally to preserve vehicle privacy; and send the sum reports and the aggregate report over a wide-area network to a RUC service provider, the RUC service provider being configured to charge the vehicles using the sum reports and credit the charger domains using the aggregate report, while being unable to determine which routes were taken by the vehicles.

2. The system of claim 1, wherein the secure application cloud is further programmed to perform operations including to:

receive, from each vehicle of the plurality of vehicles, the account of the vehicle to be charged, and for each of the plurality of charger domains, a distance traveled along roadways within a respective one of the plurality of charger domains and an amount owed by the vehicle to the respective one of the plurality of charger domains.

3. The system of claim 2, wherein the secure application cloud is further programmed to perform operations including to:

determine the total sum owed by each vehicle by totaling, for each vehicle, the amounts owed to each of the plurality of charger domains; and determine the total amounts owed to each charger domain of the plurality of charger domains by totaling the amounts owed by all vehicles to the respective charger domain.

4. The system of claim 2, wherein information received from each of the plurality of vehicles includes a RUC report, each RUC report specifying the account of the vehicle to be charged, and for each of the plurality of charger domains, the distance traveled within the respective one of the plurality of charger domains and the amount owed by the vehicle to the respective one of the plurality of charger domains.

5. The system of claim 2, wherein information received from each of the plurality of vehicles includes:

an anonymized report, indicating amounts owed to each of the charger domains for the vehicle without an identifier of the account of the vehicle; and a sum report, indicative a total amount owed by the vehicle to plurality of charger domains and the identifier of the account of the vehicle.

6. The system of claim 1, wherein the secure application cloud is further programmed to perform operations including to:

receive, from the RUC service provider, map and fees information, the map and fees information being descriptive of road geometry and fee tables for traversal of roads within each of the plurality of charger domains; and send the map and fees information to the plurality of vehicles.

7. A system for privacy-preserving road usage charging (RUC) comprising:

a vehicle comprising one or more hardware devices, programmed to execute a RUC application to perform operations including to, per periodic billing cycle:

generate a sum report indicating an account of the vehicle to be charged and a total sum owed by the vehicle;

generate an anonymized report indicating total amounts owed to each of a plurality of charger domains by the vehicle without indicating the account of the vehicle;

randomize timing and/or interval of transmission of the sum reports and the aggregate report, such that the sum reports and the aggregate report are sent at different times and cover different times, and the total sums owed by the plurality of vehicles from the sum reports and the total amounts owed to each of a plurality of charger domains from the aggregate report cover different time intervals that do not line up temporally to preserve vehicle privacy; and send the sum report and the anonymized report over a wide-area network to a RUC service provider, the RUC service provider being configured to charge the vehicle using the sum reports and credit the charger domains using the anonymized report.

8. The system of claim 7, wherein the vehicle is further programmed to perform operations including to:

receive, from the RUC service provider, map and fees information, the map and fees information being descriptive of road geometry and fee tables for traversal of roads within each of the plurality of charger domains.

9. The system of claim 7, wherein the RUC service provider is configured to periodically reconcile the sum reports and the anonymized reports, including to, for each period:

utilize the sum reports to collect value to be distributed to RUC chargers corresponding to the charger domains; and distribute the collected value to the RUC chargers according to the anonymized report.

10. A method for privacy-preserving road usage charging (RUC) comprising:

by a secure application cloud comprising one or more hardware devices executing a RUC application cloud part of a RUC application, generating a sum report for each vehicle of a plurality of vehicles, the respective sum report indicating an account of the vehicle to be charged and a total sum owed by the vehicle;

generating an aggregate report, the aggregate report indicating total amounts owed to each of a plurality of charger domains across the plurality of vehicles without indicating the accounts of the vehicles;

randomizing timing and/or interval of transmission of the sum reports and the aggregate report, such that the sum reports and the aggregate report are sent at different times and cover different times, and the total sums owed by the plurality of vehicles from the sum reports and the total amounts owed to each of a plurality of charger domains from the aggregate report cover different time intervals that do not line up temporally to preserve vehicle privacy; and sending the sum reports and the aggregate report over a wide-area network to a RUC service provider, the RUC service provider being configured to charge the vehicles using the sum reports and credit the charger domains using the aggregate report, while being unable to determine which routes were taken by the vehicles.

11. The method of claim 10, further comprising receiving, from each vehicle of the plurality of vehicles, information including the account of the vehicle to be charged, and for each of the plurality of charger domains, a distance traveled within a respective one of the plurality of charger domains and an amount owed by the vehicle to the respective one of the plurality of charger domains.

12. The method of claim 11, further comprising:

determining the total sum owed by each vehicle by totaling, for each vehicle, the amounts owed to each of the plurality of charger domains; and determining the total amounts owed to each charger domain of the plurality of charger domains by totaling the amounts owed by all vehicles to the respective charger domain.

13. The method of claim 11, wherein the information received from each of the plurality of vehicles includes a RUC report, each RUC report specifying the account of the vehicle to be charged, and for each of the plurality of charger domains, the distance traveled within the respective one of the plurality of charger domains and the amount owed by the vehicle to the respective one of the plurality of charger domains.

14. The method of claim 11, wherein the information received from each of the plurality of vehicles includes:

an anonymized report, indicating amounts owed to each of the charger domains for the vehicle without an identifier of the account of the vehicle; and a sum report, indicative a total amount owed by the vehicle to plurality of charger domains and the identifier of the account of the vehicle.

15. The method of claim 10, further comprising:

receiving, from the RUC service provider, map and fees information, the map and fees information being descriptive of road geometry and fee tables for traversal of roads within each of the plurality of charger domains; and sending the map and fees information to the plurality of vehicles.

16. A method for privacy-preserving road usage charging (RUC) comprising:

by a vehicle comprising one or more hardware devices, executing a RUC application:

periodically generating a sum report indicating an account of the vehicle to be charged and a total sum owed by the vehicle;

periodically generating an anonymized report indicating total amounts owed to each of a plurality of charger domains by the vehicle without indicating the account of the vehicle; and randomizing timing and/or interval of transmission of the sum report and the aggregate report, such that the sum report and the aggregate report are sent at different times and cover different times, and the total sums owed by the plurality of vehicles from the sum report and the total amounts owed to each of a plurality of charger domains from the aggregate report cover different time intervals that do not line up temporally to preserve vehicle privacy, periodically sending the sum report and the anonymized report over a wide-area network to a RUC service provider, the RUC service provider being configured to charge the vehicle using the sum reports and credit the charger domains using the anonymized report.

17. The method of claim 16, further comprising receiving, from the RUC service provider, map and fees information, the map and fees information being descriptive of road geometry and fee tables for traversal of roads within each of the plurality of charger domains.

18. The method of claim 16, further comprising periodically reconciling the sum reports and the anonymized reports, including, for each period:

utilizing the sum reports to collect value to be distributed to RUC chargers corresponding to the charger domains; and distributing the collected value to the RUC chargers according to the anonymized report.

19. The system of claim 7, wherein the vehicle is further programmed to perform operations including to, for each periodic cycle, schedule the sending of the sum report at a random amount of time around the sending of the anonymized report.

20. The method of claim 16, further comprising scheduling the sending of the sum report at a random amount of time around the sending of the anonymized report.

* * * * *